Figure 1:
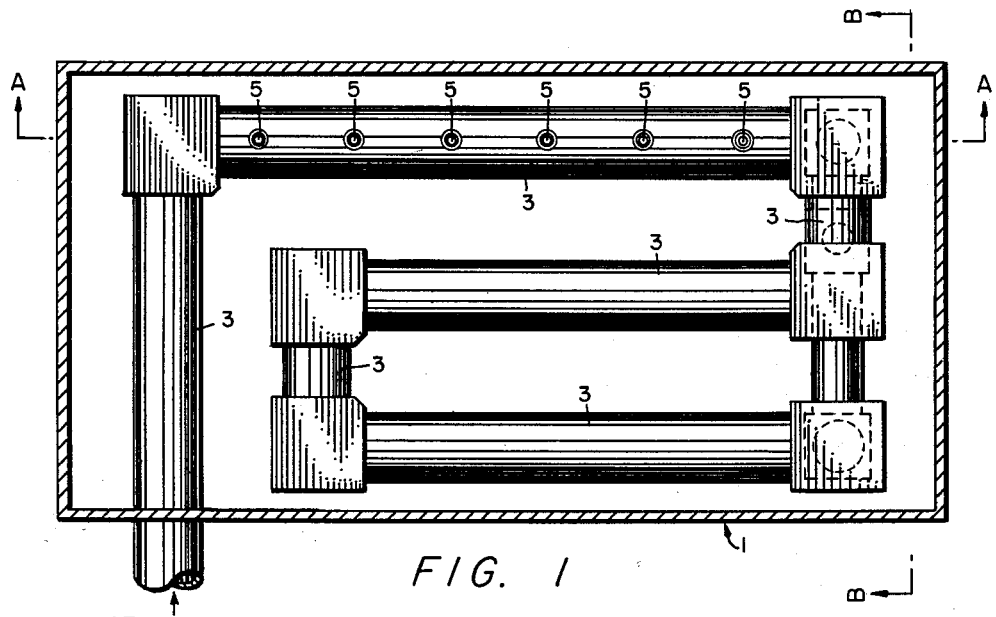

Feb. 26, 1963     C. H. DRAPER ETAL     3,079,231
COOLING PROCESS FOR HCl-CONTAINING GAS
Filed Aug. 24, 1959

HOT HCl GAS
FROM HCl FURNACE

LIQUID HCl
CONDENSATE

COOLED HCl GAS TO
HCl ABSORBER

INVENTORS
CHARLES H. DRAPER
ROBERT C. SUTTER

BY *Warburton & Cross*

ATTORNEYS

United States Patent Office 3,079,231
Patented Feb. 26, 1963

3,079,231
COOLING PROCESS FOR HCl-CONTAINING GAS
Charles H. Draper and Robert C. Sutter, Painesville, Ohio, assignors to Diamond Alkali Company, Cleveland, Ohio, a corporation of Delaware
Filed Aug. 24, 1959, Ser. No. 835,563
5 Claims. (Cl. 23—154)

This invention relates to improvements in a process for producing hydrochloric acid and, more particularly, relates to an improved method of cooling HCl-containing gas from furnace reactions so it may be conveniently handled for processing into hydrochloric acid.

HCl gas is commonly produced by decomposing sodium chloride with sulfuric acid or sodium sulfate in a salt furnace or by burning hydrogen and chlorine in a furnace. The HCl gas thus produced is removed from the furnace at temperatures often in excess of 2000° F. At these temperatures, the HCl gas is extremely corrosive to the equipment and is very difficult to handle. It is, therefore, necessary that the HCl gas be cooled before it is further processed, as for example, by absorbing in water, to produce hydrochloric acid.

Heretofore, it has generally been the practice to cool these hot HCl gases by passing them through a series of gas impervious tubes, which tubes are of graphite or quartz or some similar material. These tubes are submerged in a water tank or arranged in some other manner so that water may be passed over them so as to cool the hot HCl gas. Although such apparatus is effective in cooling the hot HCl gases to a temperature at which they may be conveniently absorbed in water so as to form hydrochloric acid, it is expensive both to install and to maintain after the initial installation. Additionally, in such cooling apparatus, there is often considerable water leakage and a considerably pressure drop through the cooler.

In a relatively few instances, the above-described multiple tube submerged cascade cooler has been replaced by a cooling system wherein there is direct contact between the hot HCl gases and an aqueous cooling liquid. In such apparatus, the hot HCl gas is passed counter-current to a large volume of a suitable cooling medium, such as water. The hot HCl gases are cooled by passing in contact with the water so that cooled HCl gas is recovered from one end of the cooler and hot water is recovered from the other end. However, such cooling means is not fully satisfactory in that comparatively large volumes of liquid must be handled and additionally, there is considerable absorption of the HCl gas in the cooling water. Thus, the cooling water must itself be cooled and then recycled or treated in some manner so as to recover the HCl which has been absorbed therein. Inasmuch as either operation is expensive and thus adds to the cost of the product, HCl, this method of cooling has not been found to be completely satisfactory.

It is, therefore, an object of the present invention to provide an improved method for cooling hot HCl gases so that they may be more easily utilized to produce hydrochloric acid.

Another object of the present invention is to provide an improved method for cooling hot HCl gases, which method is inexpensive to operate and install as compared to cooling methods utilizing multiple tube submerged cascade-type coolers.

A further object of the present invention is to provide an improved method of cooling hot HCl gases, which method does not involve problems of HCl absorption and disposition of large quantities of cooling medium as in the previously-used direct contact cooling methods.

These and other objects will become apparent to those skilled in the art from the description of the invention which follows.

Figure 2:
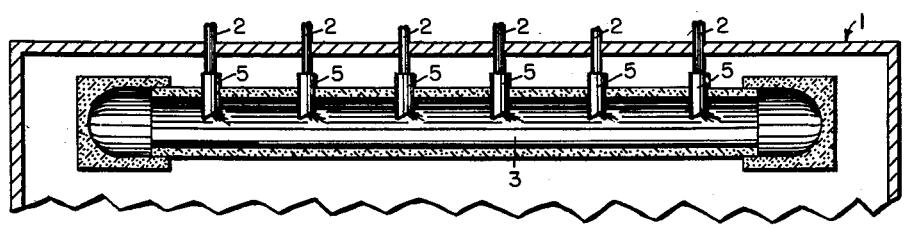
Figure 3:
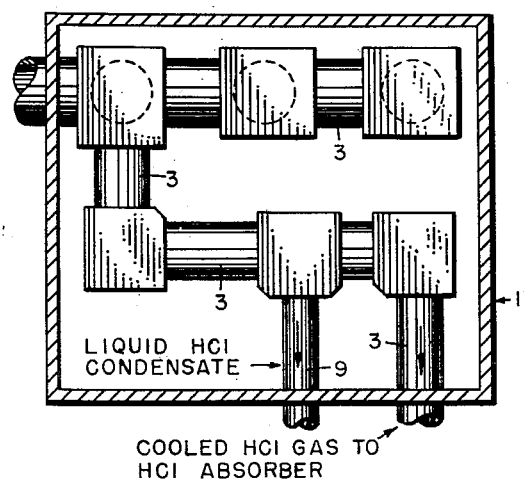

In the drawings which are attached hereto and form a part hereof, FIGURE 1 is a plan view of cooling apparatus with which the method of the present invention may be practiced, FIGURE 2 is a longitudinal cross-section taken along the line A—A of FIGURE 1, and FIGURE 3 is a cross-section taken along the line B—B of FIGURE 1.

The method of the present invention envisions passing hot HCl gas into an enclosed area wherein it is concurrently contacted with a particulate, aqueous cooling medium, vaporizing substantially all of said cooling medium, said vaporization being accomplished by utilizing the heat of said HCl gas, maintaining said HCl gas in contact with said particulate cooling medium for a period of time sufficient to reduce the temperature of said gas to the desired level and removing the thus-cooled HCl gas from the enclosed area.

More particularly, in the practice of the present method, hot HCl gas, as from a salt furnace or a furnace in which hydrogen and chlorine are burned, is passed into a cooling chamber. While this cooling chamber can be of any configuration, it has been found convenient to form of it one of a series of elongated conduits through which the hot HCl gas to be cooled is passed. Where the initial temperature of the HCl gas to be cooled is extremely high, e.g., 2000° F. or higher, it is desirable to cool the external surface of these condits, as for example, by passing water thereover, so as to protect the conduit from the corrosive action of the HCl gas at these high temperatures.

Within the cooler, the hot HCl gas is concurrently contacted with a particulate, aqueous cooling medium. It has been found by concurrently contacting hot HCl gas with the cooling medium, rather than counter-currently contacting it, a better distribution of the cooling medium in the hot HCl gas is obtained, and additionally, the possibility of getting liquid back into the HCl furnace is reduced. While any aqueous cooling medium can be used in the present method, it will be appreciated that the cooling medium should not be one which will contaminate the HCl gas. Moreover, it is preferable not to use a cooling medium which must be separated from the HCl gas before the gas can be used to form hydrochloric acid inasmuch as such separation, regardless of how easily it may be performed, will add to the cost of the hydrochloric acid produced by the present process. Ideally, because it absorbs more heat per liquid volume upon vaporization, the cooling medium should be water. However, where the process for producing the hydrochloric acid is a closed system, the addition of sufficient quantities of water to cool the hot HCl gas cannot be tolerated in the system. In such a system, therefore, the preferred cooling medium is an aqueous solution of hydrochloric acid, e.g., 20% or 36% HCl. Of these the hydrochloric acid containing 20% HCl is generally preferred because it absorbs slightly more heat per liquid volume upon vaporization than does the hydrochloric acid containing 36% HCl.

The aqueous cooling solution, preferably, an aqueous solution of hydrochloric acid, is sprayed or broken up into small discrete particles in any other convenient manner, which particles are brought into concurrent contact with the hot HCl gases. It will be appreciated, that the amount of the hydrochloric acid solution introduced into the hot HCl gas will depend upon both the temperature of the HCl gas and the temperature to which it is desired to reduce the HCl gas. Thus, the amount of cooling acid introduced must be sufficient to reduce the temperature of the hot HCl gas to the desired level, but it should not be so great that substantially all of this cooling acid is not vaporized. Where the quantity of cooling acid used is so large that substantial quantities of it are left unvaporized, there is a considerable HCl loss by means of absorption into the unvaporized hydrochloric acid, which acid must then be recovered so as to avoid the loss of the HCl absorbed. This necessitates the handling of large volumes of liquid at a point in the process where such liquid volumes are not ordinarily handled, thus adding to the cost of the process.

It will further be appreciated that the length of the cooling chamber, where it is in the form of a gas and liquid impervious conduit, will likewise depend upon the initial temperature of the HCl gas and the temperature to which the gas is desired to be reduced. Theoretically, this length need only be sufficient to provide for complete vaporization of the cooling acid inasmuch as the volume of cooling acid used, if completely vaporized, will effect the desired cooling of the HCl gas. However, in actual practice, the length of the cooling chamber conduit will be in excess of that theoretically required so as to provide a safety factor to insure complete vaporization of the cooling medium.

Once the HCl gas has been passed through the cooler, and it is cooled to the desired temperature, it is removed for processing into hydrochloric acid. Generally, this processing will comprise passing the HCl gas to an absorber wherein it is absorbed in water to form hydrochloric acid of the desired strength.

It has been found that the method of the present invention as compared to the prior methods wherein a multitube submerged cascade-type cooler is used has many advantages. Initially, the apparatus for practicing the present invention is more easily constructed at a lower capital investment than is that required for the multitube submerged cascade-type coolers. Moreover, in the present apparatus there is less water leakage and hence less maintenance of the equipment than for previously-used cooling apparatus. Additonally, the pressure drop through the present apparatus is less than that through the prior art apparatus thus making it possible to operate the system with a lesser vacuum than was previously possible. There is, therefore, less air dilution of the HCl gas through minute leaks in the system and the volume of gas passing through the system is also less, thus reducing the load on the absorbing and condensing portions of the system.

A further advantage which has been realized by practicing the present method is that an increased capacity of the absorber system is obtained as compared to a process using the multi-tube submerged cascade-type coolers. This increase in the absorber capacity is evidenced by the fact that in two runs, one using a multi-tube submerged cascade-type cooler and one using the cooler of the present invention, both with the same absorbing system, a maximum of 15 tons of HCl a day was handled by the absorber system in the first run, while with the present method at least 21½ tons per day of HCl were handled by the absorber system. This is an increase of at least about 43% in the capacity of the absorbers. This is, however, only the minimum increase which can be achieved with the present method inasmuch as at the time this run was made the burners in the HCl furnace were operating at full capacity while the top capacity of the absorber had not apparently been reached. The exact explanation for this increase in absorber capacity when using the method of the present invention, is not known. However, it is believed that because of the high moisture content of the HCl gas as it comes from the coolers used in the present method, drop-wise condensation occurs in the gas stream in the falling film absorber. Thus, the large droplet areas then serve as heat transfer areas for conveying heat from the gas stream to the falling liquid film in the absorber tubes. It is, thus, seen that by utilizing the method of the present invention, it is possible to install larger capacity burners without the necessity for a similar increase in the capacity of the absorber system.

Referring now to the drawings, as shown in FIGURE 1, 1 is an open tank, which tank is filled with water or other cooling medium. A series of gas and water impervious conduits 3 are arranged within the tank 1, so as to be beneath the surface of the water or cooling medium which fills the tank. A series of spray nozzles, indicated generally as 5 in FIGURE 1, are placed in one of the conduits 3. As shown more clearly in FIGURE 2, the spray nozzles 5 with their connecting fluid supply lines 2, are arranged in the conduit 3 so as to produce a substantially unidirectional spray in the conduit, concurrent to the flow of the hot HCl gas therethrough. As shown in FIGURE 3, the cooled HCl gas, after passing through the conduits 3 is removed from the bottom of the tank 1 and passed to an HCl absorber (not shown). Similarly, any liquid hydrochloric acid condensate is removed through the conduit 9 prior to the removal of the cooled HCl gases.

In operation, hot HCl gas at a temperature of about 2000° F. or higher, is passed from an HCl furnace (not shown) into the series of conduits 3, which conduits are positioned below the surface of the water in tank 1. In passing through the conduits 3, the hot HCl gas is contacted with a particulate aqueous hydrochloric acid solution, which solution is introduced into the conduits by means of the spray members 5. Although five spray members have been shown, positioned in only one of the arms of the conduits 3, it will be appreciated that the number and position of these spray members is optional, the only requirement being that there be enough spray nozzles to supply sufficient aqueous hydrochloric acid to effect the cooling of the HCl gas and that the nozzles be positioned to achieve this end. The aqueous hydrochloric acid introduced through the spray nozzles 5 is directed concurrently with the flow of the hot HCl gas stream so as to provide a more effective distribution of the cooling acid in the gas stream as well as to minimize the possibility of introducing liquid into the HCl furnace. After passing through the conduits 3, the HCl gas which has been cooled to the desired temperature, passes to an absorber (not shown) wherein it is absorbed in water to produce hydrochloric acid. Any liquid in the conduits 3, either as unvaporized cooling acid or condensed HCl gas is removed through the conduit 9 just prior to removing the cooled HCl gas to the absorber. If desired, this liquid may be recycled to be used as part of the cooling acid.

It will, of course, be appreciated that the configuration of the conduits shown in the accompanying drawings is intended to be merely illustrative of apparatus for use in the practice of the present method. Other conduit configurations can be used equally well, depending upon the initial temperature of the HCl gas entering the cooling system and the temperature to which the HCl gas is to be cooled. The only criteria for the conduit configuration is that it must be sufficiently long to provide substantially complete vaporization of all of the cooling acid which is added.

In actual operation, using the apparatus shown in the accompanying drawing, hydrogen and chlorine are fed into an HCl furnace wherein they are burned to produce a hot HCl gas at a temperature of about 3000° F. Hydrochloric acid containing 20% HCl is fed to the spray nozzles at an initial rate of 0.2 to 0.3 gal./minute. This amount of cooling acid is sufficient to maintain the apparatus at the desired temperature during the initial warm-up. When the exit gas from the cooling apparatus has reached a temperature of about 140° F., the hydrochloric cooling acid to the spray is increased to a rate of about 0.126 gal./minute per ton per day of chlorine burned in the furnace. This amount of cooling acid is sufficient to maintain the temperature of the exit HCl gas from the cooler at about 170° F., which is the desired temperature for absorbing the HCl gas. As variations occur in the amount of chlorine burned in the furnace, and hence the amount of HCl gas produced, the amount of cooling acid to the spray is likewise adjusted so as to maintain the desired rate of 0.126 gal./minute per ton per day of chlorine burned. It is found that when operating under these conditions, substantially all of the cooling acid is vaporized and the hot HCl gas is cooled to a temperature at which it can be easily handled for absorbing to produce hydrochloric acid.

While there have been described various embodiments of the invention, the methods described are not intended to be understood as limiting the scope of the invention as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A method of cooling hot hydrogen chloride gas subsequent to its manufacture and prior to its absorption in water to form hydrochloric acid, which method comprises introducing said hot hydrogen chloride gas into an enclosed cooling zone; contacting said gas within said cooling zone with a concurrently directed aqueous cooling medium selected from the group consisting of water and aqueous solutions of hydrochloric acid, said cooling medium being introduced into said cooling zone in the form of a spray; maintaining said gas in contact with said cooling medium, for a period of time such that the temperature of said gas is reduced to the desired level and substantially all of said cooling medium is simultaneously vaporized by means of the heat of said gas, so that substantially none of said gas is absorbed by said cooling medium; and recovering the cooled hydrogen chloride gas for passage into an absorber; by which method the capacity of said absorber for hydrogen chloride gas is increased.

2. The method according to claim 1 wherein the cooling medium is aqueous hydrochloric acid.

3. The method according to claim 2 wherein the aqueous hydrochloric acid cooling medium contains about 20% hydrogen chloride.

4. The method according to claim 2 wherein sufficient cooling medium is employed to maintain the temperature of the hydrogen chloride gas leaving said enclosed cooling zone at about 170° F.

5. A method of cooling hot hydrogen chloride gas subsequent to its manufacture and prior to its absorption in water to form hydrochloric acid, which method comprises introducing said gas into an enclosed cooling zone; contacting said gas within said cooling zone with a concurrently directed spray of aqueous hydrochloric acid containing about 20% hydrogen chloride, said aqueous hydrochloric acid being introduced initially at the rate of about 0.2–0.3 gallon per minute until the temperature of the hydrogen chloride gas leaving the cooling zone is about 140° F.; thereafter increasing the rate of addition of said aqueous hydrochloric acid so as to maintain the temperature of the hydrogen chloride gas leaving the cooling zone at about 170° F. and simultaneously to vaporize substantially all of said aqueous hydrochloric acid by means of the heat of said gas, so that substantially none of said gas is absorbed by said aqueous hydrochloric acid; and recovering the cooled hydrogen chloride gas for passage into an absorber; by which method the capacity of said absorber for hydrogen chloride gas is increased.

References Cited in the file of this patent

UNITED STATES PATENTS

| | | |
|---|---|---|
| 1,420,209 | Paulus | June 20, 1922 |
| 2,295,591 | Maude | Sept. 15, 1942 |
| 2,444,256 | Hill | June 29, 1948 |
| 2,625,463 | Norton | Jan. 13, 1953 |
| 2,950,180 | Kunzer et al. | Aug. 23, 1960 |

FOREIGN PATENTS

| | | |
|---|---|---|
| 600,459 | Canada | June 21, 1960 |